Patented Oct. 4, 1949

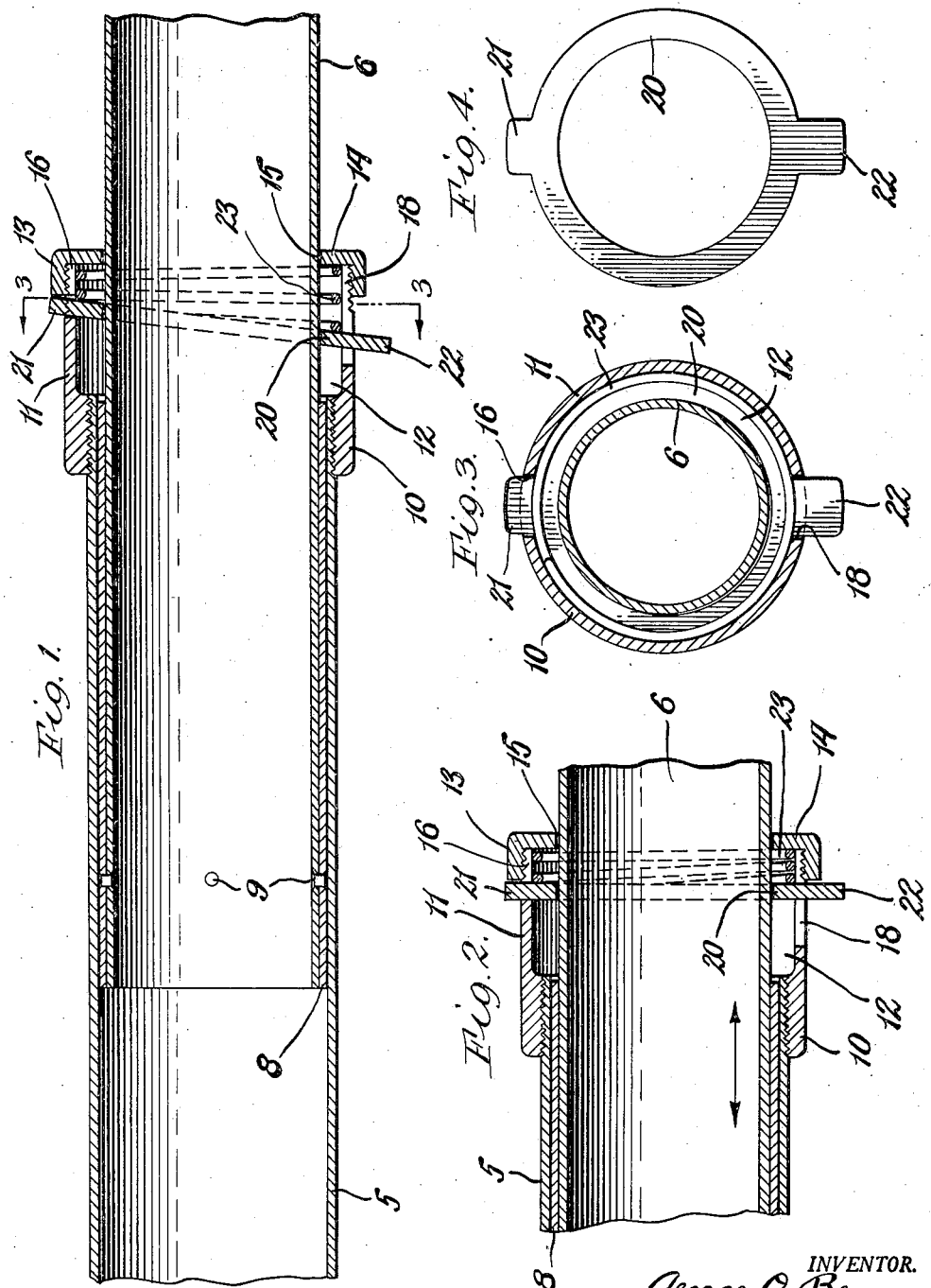

2,483,395

UNITED STATES PATENT OFFICE 2,483,395

TELESCOPING STRUCTURE

George O. Benson, Niagara Falls, N. Y., assignor to Chisholm-Ryder Company, Incorporated, Niagara Falls, N. Y., a corporation of New York Application May 14, 1945, Serial No. 593,670

2 Claims. (Cl. 287—58)

This invention relates to a telescopic structure and more particularly to an adjustable telescopic support which can be extended to any desired length and held in such extended condition, such telescopic supports being useful as extensible tent poles and the like.

One of the principal objects of the invention is to provide a latch for holding two telescopic members in any desired position with reference to each other, which latch permits the members to be pulled apart to the desired length but prevents the reverse movement of the parts until the latch is released.

Another object of the invention is to provide such a latching mechanism which is strong and will resist forces tending to collapse the telescopic structure without breaking or being bent into an inoperative condition.

Another object is to provide such a latch for telescopic members which can be readily released when it is desired to collapse this structure.

Another object is to provide such a latch which is extremely compact and does not add materially to the bulk of the telescopic structure.

Another object is to provide such a latch which is simple and inexpensive in construction and which will stand up under conditions of severe and constant use without getting out of order or requiring repairs.

In the accompanying drawings:

Fig. 1 is a fragmentary longitudinal section through a pair of telescoping members having a latch embodying the present invention, the latch being shown in its operative position.

Fig. 2 is a fragmentary view similar to Fig. 1 showing the latch released to permit nesting of the two telescopic members.

Fig. 3 is a transverse section, taken on line 3—3, Fig. 1.

Fig. 4 is a plan view of the latching ring employed to hold the telescopic sections in their extended position.

The invention is shown as embodied in a telescopic structure having an outer cylindrical tube 5 in which is slidingly fitted an inner cylindrical tube 6, the tube 6 being slidable axially into the tube 5 so as to nest therein. The inner end of the inner tube 6 is shown as having a sleeve 8 secured thereon, as by welding or rivets 9, this sleeve providing the sliding contact surface between the tubes 5 and 6. However, the sleeve 8 is not an essential feature of the invention.

The outer end of the tube 5 is shown as being enlarged at its end, as indicated at 10. While this enlargement could be made integral with the tube 5 by expanding it, the tube is shown as being threaded and the enlargement 10 is shown as provided by a cup-shaped cylindrical nut, this nut having a cylindrical wall 11 extending axially outward from the end of the outer tube 5 and forming a cylindrical chamber 12 surrounding the inner tube 6. The outer extremity of this cup-shaped nut 11 is shown as being externally threaded to receive a threaded cap ring 13, this cap ring having an axially inwardly projecting flange 14 which is provided with a circular opening 15 in which the inner tube 6 is fitted.

At one side the cup-shaped nut 10 is provided with a comparatively shallow slot 16 extending axially inward from the outer end or rim thereof and at its opposite side the nut 10 is provided with a comparatively deep slot 18 which extends axially inward from the outer end or rim thereof. A flat metal ring 20 is fitted within the cylindrical chamber 12 provided by the cup-shaped nut 10 and around the tube 6, the aperture through this ring being slightly larger than the outside diameter of the inner tube 6. At one side this flat metal ring 20 is provided with a comparatively short outwardly extending tongue 21 which fits into the comparatively shallow slot 16. At its opposite side this flat metal ring 20 is provided with a comparatively long outwardly projecting tongue 22 which projects through the comparatively deep slot 18 of the cup-shaped nut 10 and provides a fingerpiece for releasing the latch. The flat ring 20 is shown as biased to the cocked position shown in Fig. 1 by a spring 23, this spring being shown as being in the form of a helical compression spring arranged within the cylindrical chamber 12 of the cup-shaped nut 10 and surrounding the inner tube 6 and interposed between the flat metal ring 20 and the threaded cap ring 13 mounted on the extremity of the cup-shaped nut 10. The spring 23 is not essential to the operation of the latch since it will be seen that it could normally fall to the cocked position shown by gravity. Further, it is not essential that it be in the form of the helical compression spring shown.

When it is desired to extend the tubes 5 and 6 telescopically, all that is necessary is to pull the two sections axially apart. When this occurs, the flat metal ring is moved against the resistance of the helical compression spring 23 to a position at right angles to the axis of the tubes and since the opening therethrough is slightly larger than the outside diameter of the inner tube 6, it permits this tube 6 to be moved freely outwardly relative to the tube 5 or to the right, as illustrated in Fig. 1. As soon, however, as the outward pull is released or when pressure is applied in the opposite direction, the ring 20 is forced back to the cocked position shown in Fig. 1 by the helical compression spring 23, the ring fulcruming in its movement in both directions about the point of engagement between its short tongue 21 and the bottom of the slot 16 in the rim of the cup-shaped nut 10. The spring 23 is not essential to this action as indicated above, however. In this position, shown in Fig. 1, the ring is cocked relative to the axis of the tubes and hence inward movement of the tube 6 relative to the tube 5 is prevented by the binding of the cocked ring 20 against the periphery of the inner tube 6. The greater the axial collapsing pressure imposed upon the telescopic structure, the greater the binding action of the cocked ring 20 and hence it will be seen that this ring provides an adequate latch against collapsing movement of the telescopic tubes but at the same time permits the ready extension of these tubes.

When it is desired to nest the tubes, the user presses the tongue or fingerpiece 22 to the right, as viewed in Figs. 1 and 2, against the threaded cap ring 13 as a stop. In this position the flat ring 20 is at right angles to the axis of the tubes and hence it will be seen that the inner tube 6 can be freely moved axially in either direction, as indicated by the double headed arrow in Fig. 2, inasmuch as the opening through the flat ring 20 is larger than the outside diameter of the inner tube 6.

It will be seen that the present invention provides an extremely simple latch and which is also compact and does not have exposed parts which are liable to be accidentally moved to a position where the latch is released. In particular, it will be noted that the latching member comprises the simple flat metal ring 20 provided with the two tongues 21 and 22 of unequal length, the smaller of these tongues serving to fulcrum the ring in the comparatively shallow slot 16 of the cup-shaped nut 10 and the larger of these tongues serving to extend through the opposite deeper slot 18 of the cup-shaped nut 10 and to provide a fingerpiece for moving the ring 20 to operative and inoperative positions.

I claim as my invention:

1. A telescopic structure, comprising inner and outer slidably interfitted tubes, a cup-shaped tubular enlargement provided at one end of said outer tube with its wall projecting axially outwardly therefrom and coaxial therewith to provide a chamber surrounding said inner tube, said wall being provided with a relatively shallow slot extending axially from the rim thereof and being provided in another part with a second relatively deep slot extending axially from the rim thereof, a cap removably secured to said rim of said wall and covering the end portions only of said slots and having an opening receiving said inner tube, a member arranged in said chamber and loosely embracing said inner tube when arranged at right angles thereto and seizing said inner tube when moved to a cocked position with reference to the axis of said inner tube, a tongue projecting radially outwardly from said member and fulcrumed in said first slot, a second tongue projecting radially outwardly from another part of said member and through said second slot and forming a fingerpiece for manually moving said member to said position at right angles to release said inner tube, and spring means in said chamber and surrounding said inner tube and interposed between said cap and member to bias said member to said cocked position.

2. A telescopic structure, comprising inner and outer slidably and rotatably interfitted cylindrical tubes, a cylindrical cup-shaped tubular enlargement fast to one end of said outer tube with its wall projecting axially outwardly therefrom and coaxial therewith to provide a chamber surrounding said inner tube, said wall being provided in one side with a relatively shallow slot extending axially from the rim thereof and being provided in its opposite side with a second relatively deep slot extending axially from the rim thereof, a cap ring removably secured to said rim of said wall and covering end portions only said slots and having an opening receiving said inner tube, a flat ring arranged in said chamber and loosely embracing said inner tube when arranged at right angles thereto and seizing said inner tube when moved to a cocked position with reference to the axis of said inner tube, an integral tongue projecting radially outwardly from said flat ring and fulcrumed in said first slot, a second integral tongue projecting radially outwardly from the opposite side of said flat ring and through said second slot and forming a fingerpiece for manually moving said flat ring to said position at right angles to release said inner tube, and spring means in said chamber and surrounding said inner tube and interposed between said cap ring and flat ring to bias said flat ring to said cocked position.

GEORGE O. BENSON.

REFERENCES CITED

The following references are of record in the file of this patent:

UNITED STATES PATENTS

| Number | Name | Date |
|---|---|---|
| 836,303 | Christensen | Nov. 20, 1906 |
| 2,051,969 | Shastock | Aug. 25, 1936 |
| 2,090,550 | Pilblad | Aug. 17, 1937 |
| 2,227,395 | Lucker | Dec. 31, 1940 |
| 2,234,970 | Lucker | Mar. 18, 1941 |